H. A. LINET.
FAUCET.
APPLICATION FILED JAN. 2, 1920.

1,368,171. Patented Feb. 8, 1921.

WITNESSES

INVENTOR
HENRY A. LINET
BY
ATTORNEYS

UNITED STATES PATENT OFFICE.

HENRY A. LINET, OF BROOKLYN, NEW YORK.

FAUCET.

1,368,171. Specification of Letters Patent. Patented Feb. 8, 1921.

Application filed January 2, 1920. Serial No. 348,760.

*To all whom it may concern:*

Be it known that I, HENRY A. LINET, a citizen of the United States, and a resident of the city of New York, borough of Brooklyn, county of Kings, and State of New York, have invented a new and Improved Faucet, of which the following is a full, clear, and exact description.

This invention relates to faucets, and has reference more particularly to a faucet in which the hand which opens the faucet is wet by the water flowing thereout.

An object of this invention is to provide a faucet of simple construction which may be opened by an upward pressure of the hand so that the hand is wet as it opens said faucet.

Another object of this invention is to provide a faucet of the class described which may also be opened continuously for a steady stream of water.

Reference is to be had to the accompanying drawing forming a part of this specification, in which it is understood that the drawing is merely illustrative of one example of the invention, and in which—

Figure 1:
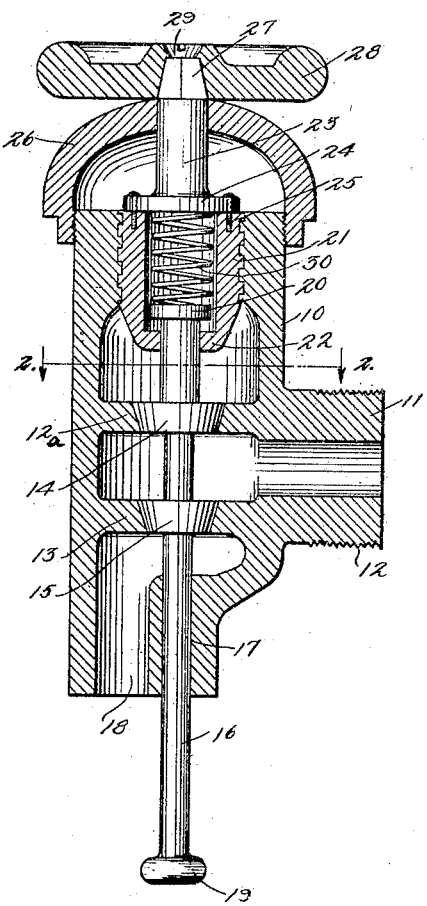
Figure 1 is a central, sectional view through the faucet.
Figure 2:
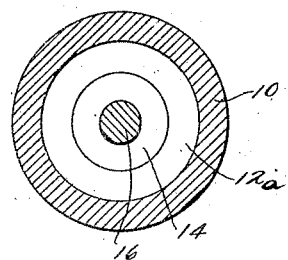
Fig. 2 is a section through Fig. 1 on the line 2—2.
Figure 3:
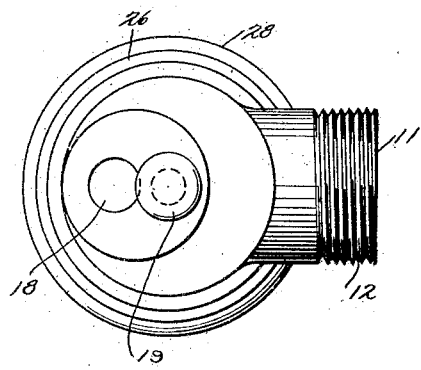
Fig. 3 is a bottom view of the faucet.

Referring to the accompanying drawing by numerals, 10 indicates a cylindrical faucet body which is provided with an inlet pipe 11 having external screw threads 12, so that said pipe can be attached to any water pipe by suitable connections. An upper valve seat $12^a$ and a lower valve seat 13 is provided in the interior of the body 10 on each side of the intake pipe 11. Valves 14 and 15 are seated on the valve seats $12^a$ and 13 respectively, and are mounted on a spindle 16 which passes coaxially therethrough. The lower end of the cylindrical body 10 is contracted and is provided with a hole 17 in which is journaled the spindle 16, so that said spindle may reciprocate axially in said hole. A hole 18 passes through the contracted end of the body 10 parallel to the hole 17, and said hole 18 is connected with the intake pipe 11 so that when said spindle is moved upward axially, the valves 14 and 15 will be lifted from their seats $12^a$ and 13 and the water will flow down through the hole 18 adjacent and parallel to the spindle 16. The lower end of the spindle 16 is provided with a knob 19 which the hand may lift when it is desired to open the faucet. The pressure of the water coming through the pipe 11 is distributed between the valves 14 and 15, a slightly larger pressure being provided on the lower valve 15 due to the larger surface presented to the pressure of the water. The upper end of the spindle 16 is provided with an annular shoulder 20 which is loosely fitted in the bushing 21, said bushing being screwed into the upper end of the cylindrical body 10. The lower end of the bushing 21 is provided with an annular shoulder 22 which engages the shoulder 20 for a purpose to be hereinafter described. A spindle 23 is provided on one end with an annular flange 24 which is fixed to the bushing 21 by means of screws 25 so that when the spindle 23 is rotated the bushing 21 will be unscrewed from the body 10 and the shoulder 22 will engage the shoulder 20 thus lifting the valves 14 and 15 from their seats, and allowing a continuous flow of water to escape through the hole 18. The upper end of the spindle 23 is journaled in a cap 26 which is screwed to the upper end of the body 10, and said spindle is also provided on its upper end with a polygonally shaped portion 27 which engages a similarly shaped portion in an operating wheel 28, said wheel being fixed to the spindle 23 by means of a screw 29. A coil spring 30 is provided in the inside of the bushing 21, said spring bearing against the flange 24 and the shoulder 20 so that the valves 14 and 15 are pressed resiliently against their seats $12^a$ and 13.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. A faucet comprising a body, a pair of valve seats on the inside of said body, means for introducing water under pressure between said valve seats, a valve seated on each of said valve seats, a spindle fixed to said valves, an annular shoulder on one end of said spindle, a bushing adapted to engage said shoulder, resilient means engaging said spindle adapted to maintain said valves in a closed position, and means for moving said bushing axially into engagement with said shoulder so that said valves will be moved to an open position.

2. A faucet comprising a body, a pair of valve seats on the inside of said body, means for introducing water under pressure between said valve seats, a valve seated on each of said valve seats, a spindle fixed to said valves, an annular shoulder formed on one end of said spindle, a bushing adapted to engage said shoulder, said bushing being provided with screw threads which engage similar screw threads on said body, means for rotating said bushing so that said bushing will engage said shoulder and move said valves to an open position, a spring positioned in said bushing and engaging the end of said spindle, said spring being adapted to maintain said valves in a closed position.

HENRY A. LINET.